United States Patent [19]

Hamada

[11] Patent Number: 5,096,280
[45] Date of Patent: Mar. 17, 1992

[54] LIGHT SOURCE APPARATUS FOR SEPARATING WHITE LIGHT INTO LIGHT COMPONENTS OF A PLURALITY OF COLORS

[75] Inventor: Hiroshi Hamada, Nara, Japan

[73] Assignee: Sharp Kabushiki Kaisha, Osaka, Japan

[21] Appl. No.: 542,926

[22] Filed: Jun. 25, 1990

[30] Foreign Application Priority Data

Jun. 27, 1989 [JP] Japan .................. 1-166024
Dec. 27, 1989 [JP] Japan .................. 1-342108

[51] Int. Cl.$^5$ ............................................ G02B 5/22
[52] U.S. Cl. .................................... 359/634; 358/482; 362/347; 359/732; 359/891
[58] Field of Search ............ 350/317, 311, 312, 237, 350/169, 170, 339 F, 340, 402, 403, 408, 416, 438, 332, 354, 445, 446; 358/302; 346/107 R; 354/482, 483; 362/166, 169, 347

[56] References Cited

U.S. PATENT DOCUMENTS

| | | | |
|---|---|---|---|
| 2,971,051 | 2/1961 | Back | 350/169 |
| 3,537,789 | 11/1970 | Kimura | 350/317 |
| 4,003,634 | 1/1977 | Graser, Jr. et al. | 359/115 |

FOREIGN PATENT DOCUMENTS 60-179723  9/1985  Japan .
61-99118   5/1986  Japan .
2-115889   4/1990  Japan .

*Primary Examiner*—Loha Ben

[57] ABSTRACT

A light source apparatus for separating a white light into light components of a plurality of colors, includes a white light source and at least two dichroic mirrors. Each mirror selects a light with a particular wavelength band from a visible light so as to transmit the light with the selected wavelength band therethrough. The mirrors reflect light with a wavelength band other than the selected wavelength band so that the transmitted wavelength bands of the mirrors are different from each other. The mirrors are arranged opposite to each other with respect to the white light source. The apparatus also includes condenser lenses which are combined with each of the dichroic mirrors. The light reflected by each of the dichroic mirrors is returned to the white light source.

4 Claims, 6 Drawing Sheets

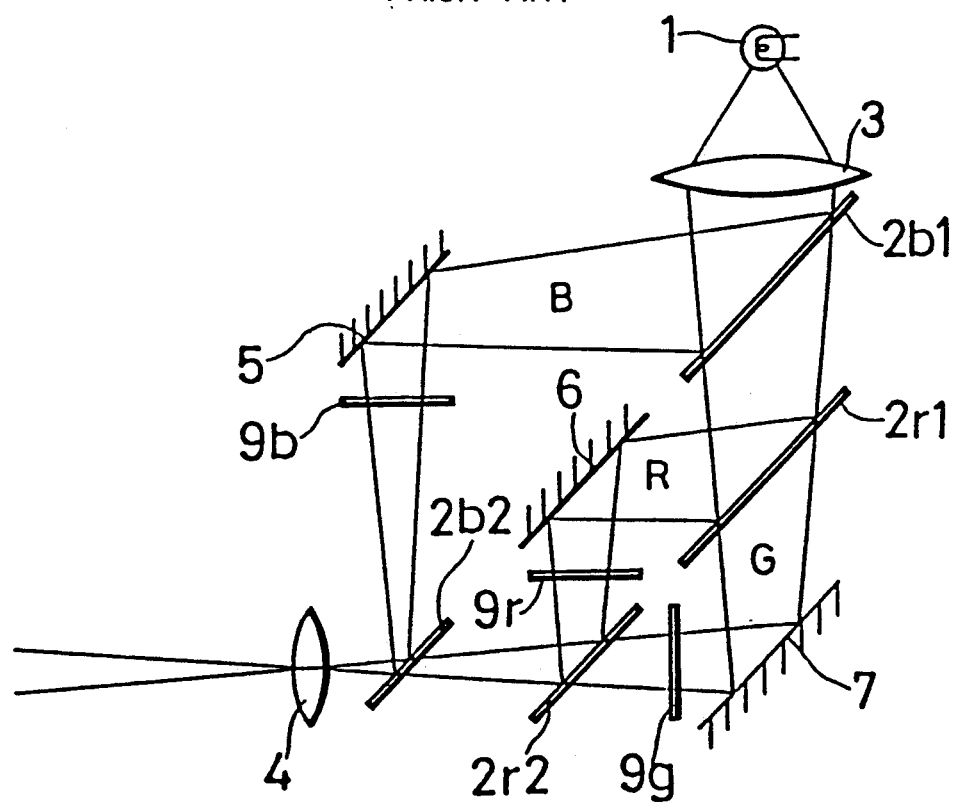

LIGHT SOURCE APPARATUS FOR SEPARATING WHITE LIGHT INTO LIGHT COMPONENTS OF A PLURALITY OF COLORS

BACKGROUND OF THE INVENTION

The present invention relates to a light source apparatus for separating a white light a light having a plurality of colors and, for example, to a light source apparatus for preferably using in a projection color image display apparatus in which a matrix type passive display element is used, and more particularly, to a light source apparatus applicable to a projection color television receiver of a large screen and an apparatus for displaying information.

First, a projection color image display apparatus to which the present invention is applicable will be described. A passive type display element for use in the projection color image display apparatus to which the present invention is applicable does not itself emit a light, but the transmittance or the reflectance thereof change according to a driving signal and displays images and characters by modulating the intensity of a light emitted by a light source. The passive type display element may be constructed by a liquid crystal display element, electrochromic display, or display elements made of light-transmittable ceramic such as a PLZT (light-transmittable ceramic made of lead, lanthanum, zircon, and titanium). Above all, the liquid crystal display element is widely utilized in a pocketable TV, a word processor, and the like. When the liquid crystal display element is used, a comparatively small display element is used in a direct sight type in these apparatii in which the diagonal line of the screen is approximately 2" to 10" (inch is used as unit).

With regard to a display on a large screen more than 40", conventionally, a projection type TV for projecting an image displayed on a cathode-ray tube has been used, however, there is the disadvantage that the TV has a limit in the brightness of an image which can be displayed on the cathode-ray tube, so that there is a problem that the greater the enlargement ratio of a projected screen becomes, the darker the screen becomes. In addition, a display apparatus in which the diagonal line of the screen is approximately tens of inches is as heavy as tens of kilograms.

As a substitution thereof, a projection type TV (television receiver) using a liquid crystal element which has been developed is already commercially available. The liquid crystal element does not itself emit a light, so that it is necessary to provide a light source. However, it has a feature that in principle, the brightness of a screen can be increasingly displayed depending on the degree of the brightness of the light source. Further, compared with the projection type TV of the cathode-ray tube system having the same screen size, the projection type TV which uses the liquid crystal element has a feature that it is compact and light, so that a further development is expected.

The projection color image display system which uses such a liquid crystal display element includes the system which uses only one liquid crystal element and the system which uses three liquid crystal elements.

Similarly to the liquid crystal TV of the direct sight type, according to the former, a liquid crystal display element is provided with a mosaic-shaped color filter and is supplied with light by an optical system similar to a slide projector. This system is disclosed, for example, in Japanese Laid-Open Patent Publication No. 59-230383. This system has a simple construction of its optical system and the number of liquid crystal display elements used is only one. Consequently, it is suitable for a compact projection system. But according to this system, approximately ⅔ of a light irradiated to the liquid crystal element is absorbed by the color filter. For example, a red color filter which corresponds to a red picture element absorbs the green and blue light components. Therefore, only ⅓ of a light emitted by the light source is utilized, so that compared with a system (described below) which uses three liquid crystal display elements, the screen is darker in an apparatus which adopts one liquid crystal display element supposing that the same light source is used by both systems.

According to the system which uses three liquid crystal display elements, means for generating the light components of the three primary colors of red, green, and blue are provided separately for each display element which form an image by controlling the light components of red, green, and blue, so that a full color display is accomplished by optically superimposing the image of each color. Japanese Laid-Open Patent Publication No. 60-3291 discloses an example of such a system which uses light sources for each of the three primary colors and color filters applicable thereto. It is possible to separate a light emitted by a single white light source into light components of the three primary colors by dichroic mirrors and irradiate the light component of each color to a liquid crystal display element corresponding to each color. This system is disclosed in Japanese Laid-Open Patent Publication No. 60-179723. The dichroic mirror used in this system is formed by the combination of a multilayer film formed by a known thin film forming technique for forming a dichroic mirror on a transparent substrate such as a glass which selectively reflects or transmits a light of a certain wavelength, and a wavelength selecting multilayer film formed on the surface of a prism like a dichroic prism for use in an imaging device of a color TV. Both multilayer films are hereinafter referred to as "a dichroic mirror" in the description of the known art. Halogen lamp, xenon lamp, metal halide lamp or the like can be used as the white light source. The emission spectrum thereof may be a continuous spectrum or a bright line spectrum.

An image formed by each display element is projected on a screen through a projection lens, and there are two projection systems depending on image-viewing side with respect to the screen. One is a front projection system in which using a reflecting type screen, the image is viewed on a projection side and the other is a rear projection system in which using a semi-transparent screen, the image is viewed from the side opposite to the projection side.

In the rear projection system, since a projecting section and a screen are accommodated in one case, the distance between the projection lens and the screen is constant. The front projection system is divided into two groups. One group consists of when the system is built in, the distance between the projection lens and the screen is constant. The other group is similar to a slide projector, the distance between the projecting section and the screen is changeable. When the distance between the projection lens and the screen is constant, it is unnecessary to adjust the focus of the projection lens after by setting the focus point when it is manufactured, so that by providing each display element of the three primary colors with a projection lens, the image of each of the three primary colors can be synthesized directly on the screen through the projection lens. Japanese Laid-Open Patent Publication No. 61-167297 discloses an example of this type. On the other hand, when the distance between the projecting section and the screen is changeable, the distance therebetween is not constant. Therefore, in this system by providing each display element of the three primary colors with a projection lens as described above, the image of each of the three primary colors are synthesized on the screen through the projection lens. A user is required to adjust the focus of the projection lens and the superimposition of images for each use, thus resulting in imposing on a user this additional burden of operations. The following system is adopted to avoid this: the system for synthesizing, in the projecting section, light components which have passed through a display element corresponding to each of the three primary colors and projecting images on the screen by using a common projection lens. In this case, the user has only to adjust the focus of one projection lens. An example of this type is disclosed in Japanese Laid-Open Patent Publication No. 60-3291.

The above description is the outline of the projection color image display apparatus which uses the passive type display element.

Of the projection color image display apparatii which use the passive type display element as described above, the present invention is applicable to the projection color image display apparatus which uses three display elements. In this projection color image display apparatus, it is advantageous in view of power consumption and caloric value to separate light emitted by a single white light source into light components of the three primary colors of red, green, and blue. As known in the art, FIG. 8 illustrates a white light emitted by a light source 1 which is guided through a condenser lens 3 and plane dichroic mirrors 2b1, 2b2, 2r1, and 2r2. Additionally, reflecting mirrors 5, 6, and 7 are provided, and liquid display display elements 9r, 9g, and 9b for each color are provided. A light which has passed through the projection lens 4 is projected on a screen. The plane dichroic mirrors 2b1 and 2b2 selectively reflect the wavelength band of blue and the plane dichroic mirrors 2r1 and 2r2 selectively reflect wavelength band of red.

According to the system of FIG. 8, it is difficult to shorten the space between the light source 1 and each of the display elements 9r, 9g, and 9b because two dichroic mirrors 2b1, 2b2 and 2r1, 2r2 in approximately the same size as that of each of the display elements 9r, 9g, and 9b are inserted between the condenser lens 3 and the display elements 9r, 9g, and 9b with the two dichroic mirrors at an angle of 45° to the optical axis of the condenser lens 3. Thus, the system has a problem that if the light from the light source is not collimated well, light is dispersed before it reaches the display elements, so that an amount of light to be effectively utilized is reduced.

In addition, the system of FIG. 8 has the following problem: That is, the dichroic mirrors are used in an incident angle of approximately 45°, so that in this case, compared with the case in which a light is incident on the dichroic mirror perpendicularly, the degree of dependency on an incident angle of the spectral characteristic is great. Therefore, if the light from the light source is not collimated well, color nonuniformity (nonuniformity of white balance) is likely to occur on the screen.

In order to overcome this problem, Japanese Laid-Open Patent Publication No. 61-99118 discloses dichroic mirrors arranged in orthogonal X-type to be used as means for separating light emitted by a single white light source into light components of the three primary colors of red, green, and blue and for synthesizing the image, of each of the three primary colors, formed by each display element. As an optical apparatus which uses dichroic mirrors arranged in the orthogonal X-type, Japanese Laid-Open Patent Publication No. 50-10019 discloses "a projection type television receiver for optically synthesizing images, formed by three cathode ray tubes which emit three primary colors, through dichroic mirrors arranged in the orthogonal X-type".

However, the dichroic mirrors arranged in the orthogonal X-type are composed of X-configured two pairs of dichroic mirrors formed by separating two dichroic mirrors into two, respectively although a dichroic mirror should essentially be jointless. Therefore, the spectral characteristic and the reflection angle thereof are likely to discontinue in jointed portions, so that seams appear on the display screen and hence the display quality degrades.

SUMMARY OF THE INVENTION

The present invention is intended to provide a light source apparatus which is compact, separates a white light into light components of a plurality of colors, and increases the utilization ratio of a light emitted by a light source.

In accomplishing these and other objects, according to one embodiment of the present invention, there is provided a light source apparatus for separating a white light into light components of a plurality of colors, comprising: a white light source; at least two dichroic mirrors each of which selects a light with a part of a wavelength band from a visible light so as to transmit the light with the selected wavelength band in the visible light therethrough, and reflect a light with a wavelength band other than the selected wavelength band in the visible light, so that transparent wavelength bands of the mirrors are different from each other, the mirrors arranged in opposition to each other with respect to the white light source; and condenser lenses each of which is combined with each of the dichroic mirrors, wherein the light reflected by each of the dichroic mirrors is returned to the white light source.

According to the construction of the present invention, at least two dichroic mirrors are arranged in opposition thereto with respect to the white light source. Each dichroic mirror selects the light with a part of the wavelength band of the visible light so as to transmit the selected light therethrough and reflects the light with the wavelength band other than the selected wavelength band. Since one embodiment of the present invention is constructed so that the reflected light is returned to the white light source, the light reflected by one dichroic mirror is guided to the other dichroic mirror positioned on the other side. Thus, the utilization ratio of the light emitted by the white light source can be increased.

The dichroic mirrors form at least a pair and separate the white light into the light components of a plurality of colors and the wavelength bands of light components transmitted through the dichroic mirrors do not overlapped with each other. In other words, the wavelength bands are separated from each other with an interval provided therebetween.

According to preferred embodiments described latter, a red-light-transmitting dichroic mirror and a blue-light-transmitting dichroic mirror form a pair, and a green-light-transmitting dichroic mirror and a mirror which reflects at least green light form another pair. In this case, transmitting spectrum of each dichroic mirror may be designed independently, so that the dichroic mirrors forming the pair is capable of increasing the utilization ratio of light components emitted by the white light source and further, separating the white light into the light components of plurality of colors.

In addition, the construction of the apparatus can be compact.

According to another embodiment of the present invention, there is provided the light source apparatus for separating a white light into light components of a plurality of colors as described in the previous aspect thereof, wherein the dichroic mirrors are spherically formed, each of the condenser lenses is arranged so that a distance between each of the condenser lenses and the white light source is longer than a distance between the corresponding dichroic mirror and the white light source.

Particularly, according to another embodiment of the present invention, each of the dichroic mirrors is formed spherically, and the distance between the white light source and each of the condenser lenses is longer than that between the white light source and the corresponding dichroic mirror. Accordingly, each dichroic mirror separates the white light emitted by the white light source into the light components of a plurality of colors, and the condenser lens positioned for each color makes the separated light components parallel.

According to a still another embodiment of the present invention, there is provided the light source apparatus for separating a white light into light components of a plurality of colors as described in the first aspect thereof, wherein a surface of each of the condenser lenses is spherical on a side of the white light source and each of the dichroic mirrors is formed on the spherical surface of each of the condenser lenses.

Furthermore, according to a still another embodiment of the present invention, the condenser lens is spherically formed on the side of the white light source and the dichroic mirror is formed on this surface. Accordingly, the light emitted by the white light source as separated into the light components of a plurality of colors by each dichroic mirror is immediately incident on the condenser lens so that the components become parallel with each other.

According to a further embodiment of the present invention, there is provided the light source apparatus for separating a white light into light components of a plurality of colors as described in the first aspect thereof, wherein each of the dichroic mirrors is arranged so that a distance between each of the dichroic mirrors and the white light source is longer than a distance between the corresponding condenser lens and the white light source, each of the dichroic mirrors being flatly formed and having a plane surface perpendicular to an optical axis of each of the condenser lenses.

Further, according to a further embodiment of the present invention, the flat dichroic mirrors are arranged so that the distance between the white light source and each of the dichroic mirrors is longer than that between the white light source and each of the condenser lenses, and each of the dichroic mirrors is perpendicular to the optical axis of the corresponding condenser lens. Accordingly, the light components of the light emitted by the white light source become parallel with each other by the condenser lenses, and thereafter, are incident on the dichroic mirrors. Light components which have passed through the dichroic mirrors travel rectilinearly in parallel. Light components which have been reflected by the dichroic mirrors travel back in parallel, then, returned to the white light source by the condenser lenses.

BRIEF DESCRIPTION OF THE DRAWINGS

These and other objects and features of the present invention will become clear from the following description taken in conjunction with the preferred embodiments thereof with reference to the accompanying drawings, in which:

FIG. 8 is a sectional view showing the prior art.

DETAILED DESCRIPTION OF THE EMBODIMENTS

Figure 1:
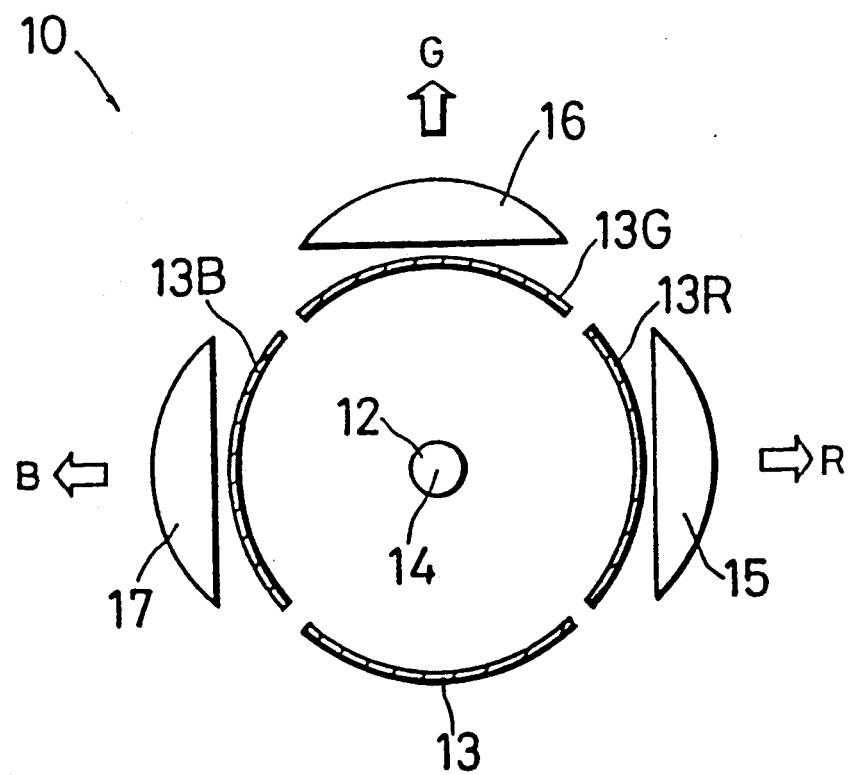
FIG. 1 is a sectional view showing a light source apparatus of one embodiment of the present invention.

Before the description of the present invention proceeds, it is to be noted that like parts are designated by like reference numerals throughout the accompanying drawings.

FIG. 1 is a simplified sectional view showing a light source apparatus 10 according to one embodiment of the present invention. The light source apparatus 10 can be embodied in a projection color image display apparatus 11 shown in FIGS. 2 through 4. A light source 12 of a white light comprising a halogen lamp, a xenon lamp or a metal halide lamp is substantially a point light source, and emits light at least in the horizontal and vertical directions in FIG. 1. Each of dichroic mirrors 13R, 13G, and 13B selectively transmits each wavelength band of red, green, and blue therethrough, thus reflecting a visible light except each selected light. Each wavelength band may be partially superimposed with each other. These dichroic mirrors 13R, 13G, and 13B are spherically formed around a point 14, serving as the point light source of the white light source 12, at the center. These dichroic mirrors 13R, 13G, and 13B are bandpass or band-reflecting filters utilizing the interferences in a plurality of dielectric thin films of different refractive indices. These dichroic mirrors 13R, 13G, and 13B have a multilayer thin film for carrying out a color separation, respectively as described above, and each mirror thereof is constructed so that films of high and low refractive indices are alternately deposited on each other with a film thickness being fundamentally integral multiples of $\frac{1}{4}$ of a reference wavelength. A film characteristic having transparent and reflecting bands is obtained by alternately depositing films on each other in this manner. The dichroic mirrors 13R and 13B are symmetrical with respect to the point 14. The dichroic mirror 13G and a spherical reflecting mirror 13 are symmetrical with respect to the point 14.

The condition of a multilayer thin film is set according to a multilayer thin film coating technique so that the red dichroic mirror 13R transmits a visible light having a wavelength longer than approximately 590 nm, the blue dichroic mirror 13B transmits a visible light having a wavelength shorter than approximately 500 nm, and the green dichroic mirror 13G transmits a visible light having a wavelength ranging from approximately 590 nm to 500 nm. The reflecting mirror 13 reflects a green light towards the green dichroic mirror 13G and may not reflect light components having other wavelength bands. The light source 12 is constructed so that a light reflected by the reflecting mirror 13 is capable of being incident on the green dichroic mirror 13G to be transmitted therethrough. The point 14 serves as the emitting portion of the white light source 12. In order to obtain parallel light, condenser lenses 15, 16, and 17 are arranged in correspondence with the dichroic mirrors 13R, 13G, and 13B, respectively.

According to this construction, when white light emitted by the light source 12 travels toward the red dichroic mirror 13R, the red dichroic mirror 13R transmits a red component (R) therethrough, but reflects other components, so that they travel back to the light source 12, pass therethrough, and travel toward the blue dichroic mirror 13B. Of these light components, a blue component which has been emitted towards the blue dichroic mirror 13B passes therethrough. The same is the case with the green component. Thus, light components emitted by the single white light source 12 are separated into the red component R, the green component G, and the blue component B, thus being taken out radially in the three directions. The light components which have traveled in the three directions are parallel due to the condenser lenses 15, 16, and 17, respectively. In FIG. 1, each condenser lens consists of a plane convex lens, but a plurality of condenser lenses or aspherical lenses are used to increase an acceptance angle.

The following advantages can be obtained by this embodiment. The first advantage is that according to the known art shown in FIG. 8, a dichroic mirror of approximately the same size as that of the display element must be used while according to the above described embodiment, small spherical dichroic mirrors 13R, 13G, and 13B may be used providing that they cover the acceptance angle of the condenser lenses 15, 16, and 17. Another advantage is that the wavelength spectrum of a light component of each color can be independently set for each of the dichroic mirrors 13R, 13G, and 13B. According to the conventional optical system shown in FIG. 8, the red and blue components are separated from a white light and the remaining light becomes a green component, so that the spectrum of the green light is automatically decided by determining the spectra of light of the red and blue components. However, in the construction shown in FIG. 1, the wavelength of each of the three dichroic mirrors 13R, 13G, and 13B can be independently selected, so that it is possible to set the spectra of the light of each color component to slightly overlap with each other, thus resulting in the increase of brightness although the color reproduction range of a displayed image and chromaticity (namely, color purity) are lost to some extent.

Figure 2:
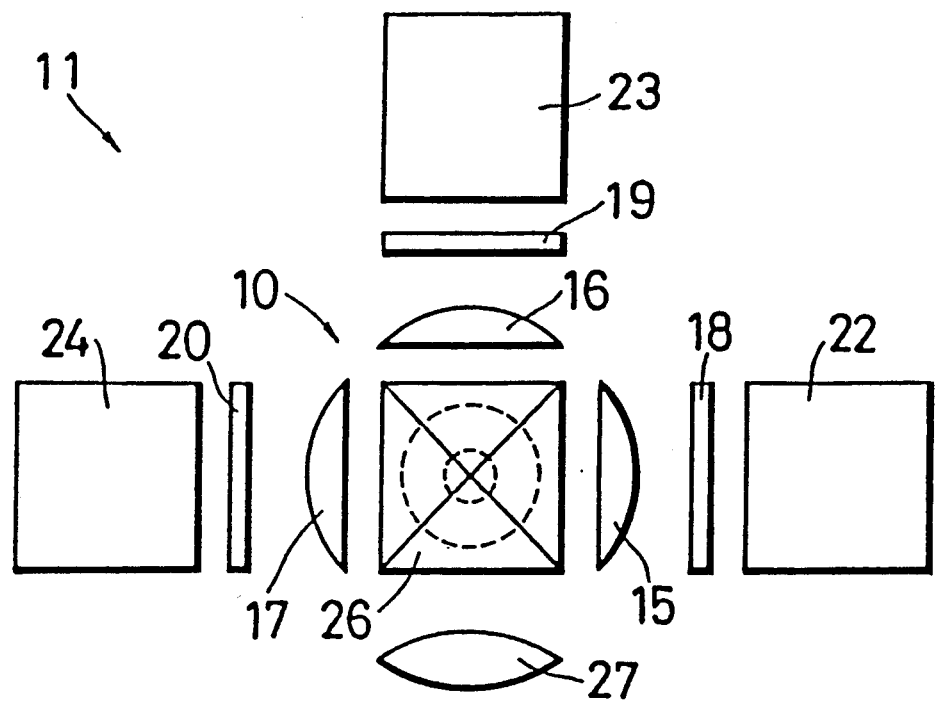
FIG. 2 is a plan view showing a projection color image display apparatus which uses the light source apparatus.
Figure 3:
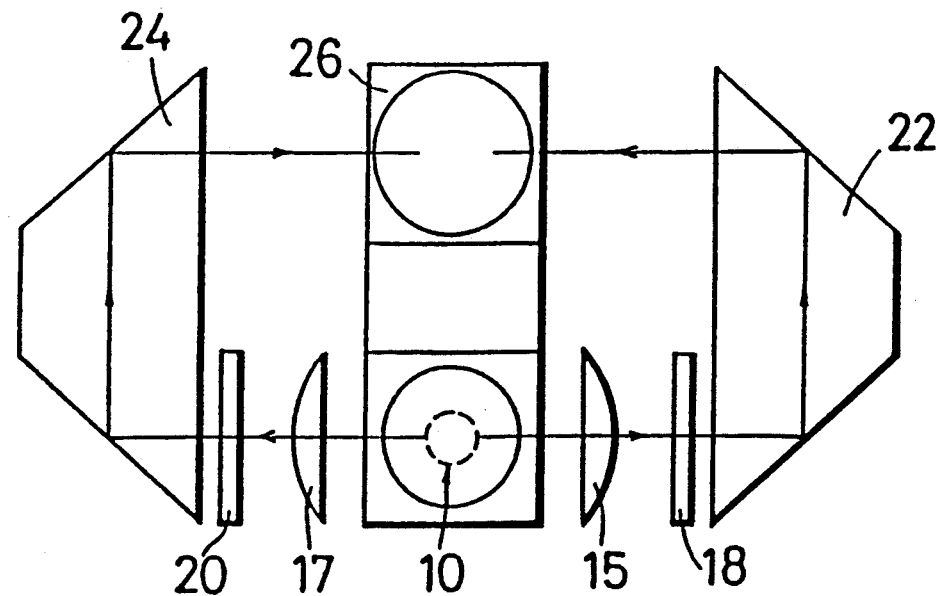
FIG. 3 is a front view showing the projection color image display apparatus shown in FIG. 2.
Figure 4:
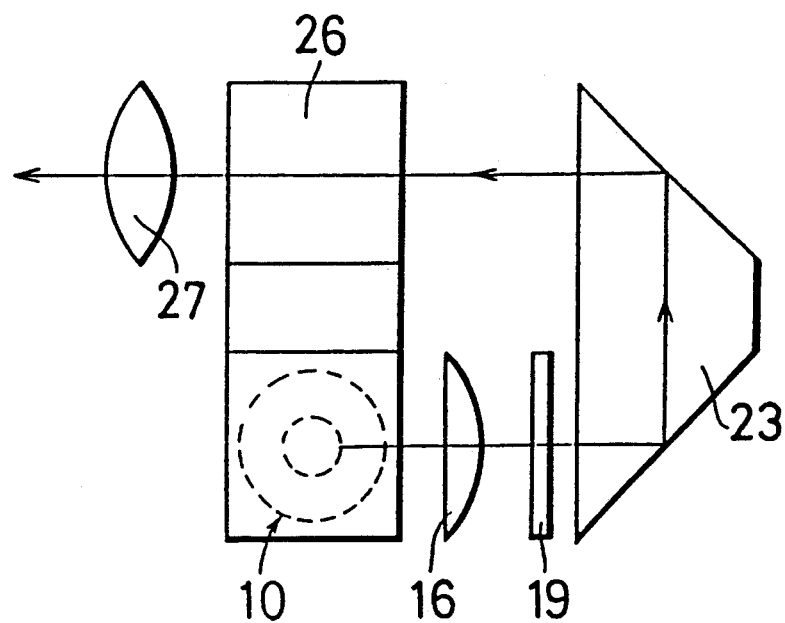
FIG. 4 is a side view showing the projection color image display apparatus.

FIG. 2 is a plan view showing the projection image display apparatus 11 which uses the light source apparatus 10 shown in FIG. 1. FIG. 3 is a front view showing the image display apparatus 11 of FIG. 2. FIG. 4 is a side view showing the image display apparatus 11, on the right side, shown in FIG. 2. Referring to these drawings, each of the components R, G, and B is transmitted through each of liquid crystal display elements 18, 19, and 20 through each of the condenser lenses 15, 16, and 17, reflected by each of rectangular prisms 22, 23, and 24, synthesized by an orthogonal X-type dichroic mirror or a prism 26, and projected on a screen by a projection lens 27. A pair of plane mirrors may be used instead of each of the prisms 22, 23, and 24. The liquid crystal display elements 18, 19, and 20 may be provided halfway along the optical path of each of the rectangular prisms 22, 23, and 24 or at each optical exit thereof. In order to reduce the aperture of the projection lens 27, a field lens or a relay lens is provided in the vicinity of each of the display elements 18, 19, and 20 so as to converge the light which has passed through each of the display elements 18, 19, and 20.

The red dichroic mirror 13R and the blue dichroic mirror 13B are positioned on either side of the light source 12, so that these passage wavelength bands of lights do not overlap each other. The desired red component (R) and the blue component (B) can be favorably taken out by this arrangement.

According to the above-described embodiment, in the projection color image display apparatus, the three dichroic mirrors 13R, 13G, and 13B which transmit the light having the wavelength band of each of red, green, and blue are formed on a spherical surface around the point 14, serving as the emitting portion of the white light source 12, and the two dichroic mirrors 13R and 13B of the three dichroic mirrors 13R, 13G, and 13B are positioned on either side of the white light source 12, so that light emitted by the light source 12 is effectively utilized and a bright projected image can be displayed. Thus, the projection color image display apparatus which is compact, capable of utilizing light emitted by the light source 12 which has a lot of luminous flux, and bright in the screen can be obtained.

Figure 5:
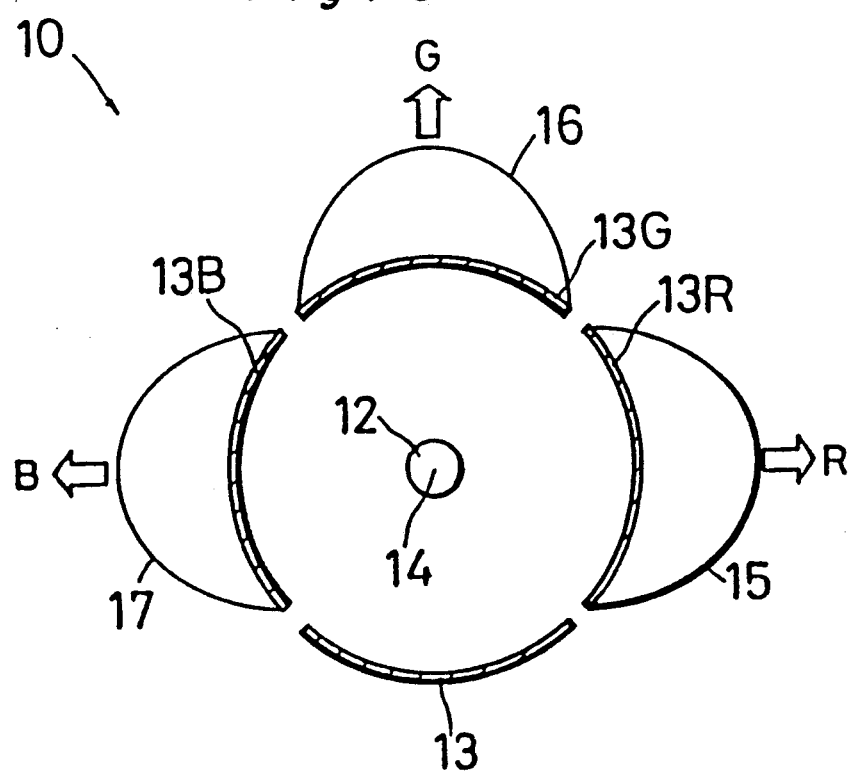
FIGS. 5, 6, and 7 are sectional views showing other embodiments of the present invention.

FIG. 5 is a simplified sectional view showing another embodiment of the present invention. According to this embodiment, the faces of the condenser lenses 15, 16, and 17 are spherical on the side of the light source 12 and the dichroic mirrors 13R, 13G, and 13B are formed on each of the surface thereof. The other face of each of the condenser lenses 15, 16, and 17 is formed as rotating elliptic face, and one of the focal points thereof is made to be coincident with each of the center of the spherical surface on which each of the dichroic mirrors 13R, 13G, and 13B is mounted, with the result that a known aplanatic lens is formed, and parallel light is obtained by positioning the white light source 12 on the center of the spherical surface.

Similarly to the embodiment relating to FIG. 1, the condenser lenses 15, 16, and 17, on which the dichroic mirrors 13R, 13G, and 13B which selectively transmits a light with each of the wavelength band of red, green, and blue are formed, are symmetrically arranged with the white light source 12 at the center. The spherical mirror 13 is arranged in opposition to the dichroic mirror 13G which transmits the light with the wavelength of green.

The operation principle of this embodiment is similar to the embodiment relating to FIG. 1.

Figure 6:
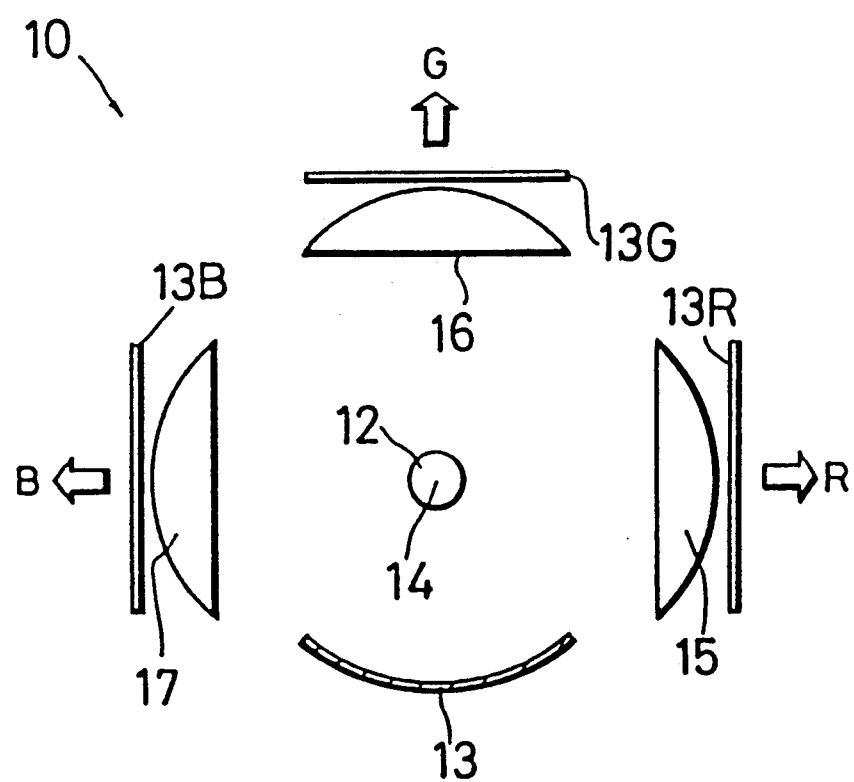

FIG. 6 is a simplified sectional view showing a still another embodiment of the present invention. According to this embodiment, the condenser lenses 15, 16, and 17 are arranged between each of the dichroic mirrors 13R, 13G, and 13B and the white light source 12.

Dispersed light emitted by the white light source 12 becomes parallel through each of the condenser lenses 15, 16, and 17, and then is incident on each of the flat dichroic mirrors 13R, 13G, and 13B arranged perpendicularly to the optical axis of each of the condenser lenses 15, 16, and 17. Of components of light which have been incident on each dichroic mirror, light of a desired wavelength passes through each dichroic mirror while light components of other wavelengths are reflected by each dichroic mirror, then travel back along the optical path thereof, pass through the white light source 12, are then incident on the other condenser lens positioned on the opposite side, thereafter are incident on the other dichroic mirror, with the result that the intensity of the light of the wavelength which has been taken out in the direction is increased.

Similarly to the embodiment relating to FIG. 1, the embodiments relating to FIGS. 5 and 6 can be used as the light source section of the projection image display apparatus as shown in FIGS. 2 through 4.

Figure 7:
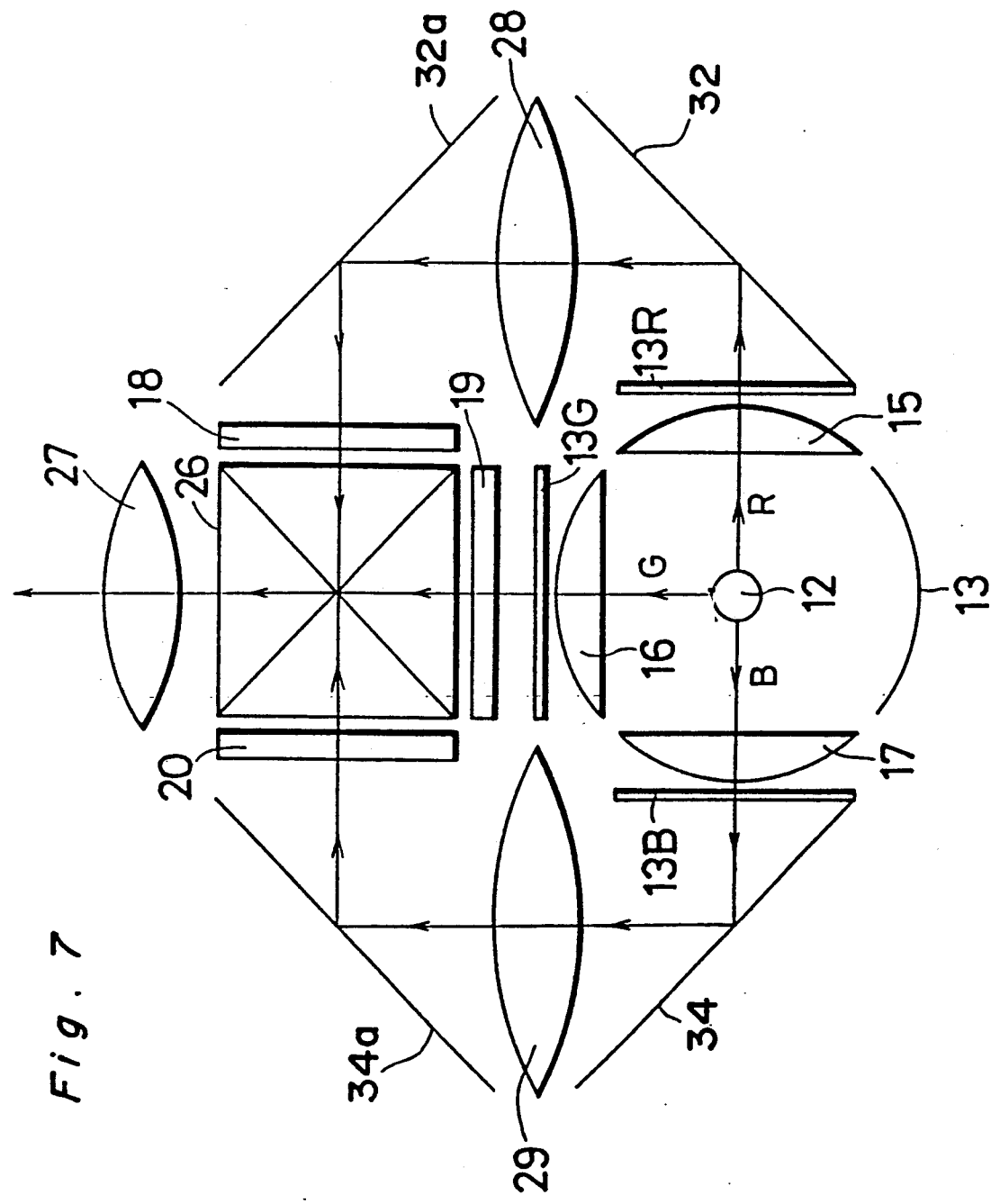

FIG. 7 is a simplified sectional view showing a further embodiment of the present invention. According to this embodiment, there are provided in a plane, including the sheet showing FIG. 7, the optical axis of a section in which a white light is separated into the three primary colors and the optical axis of a section in which the respective images of the three primary colors are synthesized. The section in which the white light is separated into the three primary colors includes the white light source 12, the condenser lenses 15, 16, and 17, the reflecting mirror 13, the dichroic mirrors 13R, 13G, and 13B, and the display elements 18, 19, and 20, and the section in which the respective images of the three primary colors are synthesized include two pairs of plane mirrors 32, 32a; and 34, 34a, two relay lenses 28 and 29, the orthogonal X-type dichroic mirror or the prism 26, and the projection lens 27. The relay lenses 28 and 29 are provided to compensate the difference of optical path lengths from the white light source 12 and prevent the illuminance of a light of each color from being unbalanced.

In the embodiments shown in FIGS. 2 through 4, the plane including the optical axis of the section in which the white light is separated into the three primary colors is parallel with the plane including the optical axis of the section in which the respective images of the three primary colors are synthesized, and these two planes are vertically spaced from each other in FIGS. 3 and 4. Compared with a so-called two-storied construction, according to this embodiment, it is possible to design the entire apparatus in a thin construction.

In the above-described embodiments, the case in which the respective images of the three primary colors are synthesized in the projecting section and projected by one projection lens is shown, but the present invention is applicable to the case in which the respective images of the three primary colors are synthesized on a screen by three projection lenses each provided for each image.

The present invention can be embodied not only for a projection image display apparatus, but also for other uses.

As described above, according to the embodiments of the present invention, the utilization ratio of the light components emitted by the white light source can be increased by a compact construction and consequently, a display screen is bright when each of the embodiments of the present invention is embodied, for example, to carry out a projection display.

Further, according to the embodiments of the present invention, each light component emitted by the white light source is incident on the dichroic mirror perpendicularly thereto. Therefore, a preferable advantage that a color nonuniformity, namely, the nonuniformity of a white balance does not occur, can be obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A light source apparatus for separating a white light into light components of a plurality of colors, comprising:
   a white light source for producing visible light;
   at least two dichroic mirrors, each dichroic mirror selecting light having a particular wavelength band from said visible light so as to transmit said light having said particular wavelength band therethrough, each dichroic mirror reflecting light components having particular wavelength bands that are different from said particular wavelength band transmitted therethrough so that each dichroic mirror transmits light having a different wavelength band therethrough, said dichroic mirrors being arranged opposite to each other with respect to said white light source; and
   condenser lenses, each condenser lens being combined with a dichroic mirror;
   said dichroic mirrors reflecting light components not transmitted therethrough towards said white light source.

2. The light source apparatus as claimed in claim 1, wherein said dichroic mirrors are spherically formed;
   said condenser lenses being arranged so that a distance between each of said condenser lenses and said white light source is longer than a distance between a corresponding dichroic mirror and said white light source.

3. The light source apparatus as claimed in claim 1, wherein a surface of each of said condenser lenses is spherical on a side corresponding to said white light source and each of said dichroic mirrors being formed on the spherical surface of each of said condenser lenses.

4. The light source apparatus as claimed in claim 1, wherein each of said dichroic mirrors is arranged so that a distance between each of said dichroic mirrors and said white light source is longer than a distance between a corresponding condenser lens and said white light source, each of said dichroic mirrors being flatly formed and having a plane surface perpendicular to an optical axis of each of said condenser lenses.

* * * * *